United States Patent
Cha

(10) Patent No.: US 8,494,584 B2
(45) Date of Patent: Jul. 23, 2013

(54) APPARATUS AND METHOD FOR PROVIDING SIM APPLICATION TOOLKIT IN MOBILE COMMUNICATION SYSTEM

(75) Inventor: Du-Jin Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 419 days.

(21) Appl. No.: 12/343,711

(22) Filed: Dec. 24, 2008

(65) Prior Publication Data

US 2009/0170481 A1 Jul. 2, 2009

(30) Foreign Application Priority Data

Dec. 28, 2007 (KR) .................. 10-2007-0140055

(51) Int. Cl.
*H04B 1/38* (2006.01)

(52) U.S. Cl.
USPC ........... 455/558; 455/556.1; 455/556.2; 455/557; 455/420; 455/414.1

(58) Field of Classification Search
USPC .......... 455/403, 414.1, 414.2, 420, 556.1, 455/556.2, 557, 558
See application file for complete search history.

(56) References Cited

U.S. PATENT DOCUMENTS

| 7,054,613 | B2 * | 5/2006 | Smeets | 455/410 |
| 2002/0116513 | A1 * | 8/2002 | Heinonen | 709/230 |
| 2005/0143059 | A1 * | 6/2005 | Imura | 455/419 |
| 2006/0094467 | A1 * | 5/2006 | Kim et al. | 455/558 |
| 2007/0060200 | A1 * | 3/2007 | Boris et al. | 455/558 |
| 2007/0117551 | A1 * | 5/2007 | Boris et al. | 455/414.1 |
| 2008/0153546 | A1 * | 6/2008 | Gupta et al. | 455/558 |
| 2008/0182621 | A1 * | 7/2008 | Morman | 455/558 |
| 2008/0261634 | A1 * | 10/2008 | Viana et al. | 455/466 |
| 2009/0011745 | A1 * | 1/2009 | Cha | 455/414.1 |
| 2009/0082001 | A1 * | 3/2009 | Rahul et al. | 455/418 |
| 2009/0124291 | A1 * | 5/2009 | Cha | 455/564 |

FOREIGN PATENT DOCUMENTS

| EP | 1 703 751 A1 | 9/2006 |
| TW | 239758 B | 9/2005 |
| WO | 03/032664 A1 | 4/2003 |

* cited by examiner

*Primary Examiner* — Jean Gelin
(74) *Attorney, Agent, or Firm* — Jefferson IP Law, LLP

(57) ABSTRACT

The present invention relates to an apparatus and method for installing a downloaded applet of an SAT list in portable terminal. The apparatus includes a controller for conducting an applet installation process. The applet is downloaded and requested based on user's selection of an item from the SAT list which represents a list of available SAT services in the portable terminal.

20 Claims, 8 Drawing Sheets

APPARATUS AND METHOD FOR PROVIDING SIM APPLICATION TOOLKIT IN MOBILE COMMUNICATION SYSTEM

PRIORITY

This application claims the benefit under 35 U.S.C. §119(a) of a Korean patent application filed in the Korean Intellectual Property Office on Dec. 28, 2007 and assigned Serial No. 10-2007-0140055, the entire disclosure of which is hereby incorporated by reference.

BACKGROUND OF THE INVENTION

1. Field of the Invention

The present invention relates to an apparatus and method for providing a Subscriber Identity Module (SIM) Application Toolkit (SAT) in a mobile communication system. More particularly, the present invention relates to an apparatus and method for downloading an applet of an SAT list from a toolkit management server and installing the applet in a portable terminal.

2. Description of the Related Art

In recent years, the use of portable communication systems has increased dramatically. The number of users of portable communication systems has grown so much that they are effectively considered a necessity to modern people. Based on the large number of users and the market that has been created, service providers and system manufacturers are competitively developing products and services to differentiate themselves from other enterprises.

For example, certain portable terminals have been developed to include multimedia devices that are capable of providing various services in addition to the communication service. Such additional services include phonebooks, games, short messages, e-mails, MPEG Layer 3 (MP3) players, digital cameras and wireless Internet services.

In addition to the aforementioned services, portable terminals provide a function for storing a plurality of phone numbers and other necessary user information (e.g., schedules, anniversaries, memos, photos, etc.) in a separate storage medium.

Recently, a portable terminal may include a smart card, such as a Subscriber Identity Module (SIM) card, etc. The smart card includes a flash memory for storing user information and various data.

More specifically, the smart card has a user certification module for storing personnel information. Moreover, the portable terminal, using the smart card, is able to send and receive the personnel information through a SIM Application Toolkit (SAT).

In general, an SAT denotes a series of commands and procedures for operating a specific service provided by a network operator to users of mobile communication terminals. An SAT service may be provided only when both the SIM and the Mobile Equipment (ME) support the SAT.

As defined in the 3rd Generation Partnership Project (3GPP) Technical Specification (TS) 31.111 for Universal Subscriber Identity Module (USIM) Application Toolkit (USAT) and 3GPP TS 11.14 for the SIM Application Toolkit for the Subscriber Identity Module-Mobile Equipment (SIM-ME) Interface, commands for operating the SAT include a proactive command that is sent from the SIM to the ME and an envelope command that is sent from the ME to the SIM.

The proactive command includes a Display Text, a Get Inkey, a Get Input, a More Time, a Play Tone, a Poll Interval, a Refresh, a Set Up Menu, a Select Item, a Send Short Message (SM), a Send Supplementary Service (SS), a Send Unstructured Supplementary Service Data (USSD), a Set Up Call, Polling Off, a Provide Local Information, a Set Up Even List, a Perform Card Application Protocol Data Unit (APDU), a Power Off Card, a Power On Card, a Get Reader Status, a Timer Management, a Set Up Idle Mode Text, a Run At Command, a Send Dual Tone Multi-Frequency (DTMF), a Language Notification, a Launch Browser, an Open Channel, a Close Channel, a Send Data, a Get Channel Status, a Service Search, a Get Service Information, and a Declare Service.

The envelope command includes a Data Download to SIM, a Menu Selection, a Call Control by SIM, a Timer Expiration, and an Event Download.

Service providers combine such commands and transmit/receive the combined commands using a Short Message Service (SMS) to provide services. Service providers develop their own services such as connection of a call to a specific service number by the combination of the commands provided by SIM applications.

A conventional terminal may only provide a built-in SAT service implemented in advance by a service provider through an SAT for a specified service in a SIM. Accordingly, a user of the mobile communication terminal may only select an SAT menu provided in the terminal and request a specified service, such as weather information and traffic information, by sending a text message through the SAT menu or by using the calling function of the mobile communication terminal.

FIG. 1 illustrates a service screen of a conventional portable terminal.

Referring to FIG. 1, the conventional portable terminal requests the required information, using the SMS or the Multimedia Messaging System (MMS), and checks the result during SAT service. Then, as the portable terminal receives one channel allocation, the request of a radio resource can frequently occur.

Also, the portable terminal may receive the result information, which occurs for the SAT service, through an SMS message or MMS message. In this case, because the portable terminal terminates a mode supporting the SAT service, and changes the mode to verify the message, there is a problem in that the user is inconvenienced.

To address the above problem, a method of using an Unstructured Supplementary Service Data (USSD) has been proposed. The USSD is introduced to support an operator service and transmits either information or a specific command from a Global System for Mobile communication (GSM) network.

In a case of the USSD, if a user inputs a stream, the portable terminal may not interpret the stream and send a corresponding data to that effect. The portable terminal then receives information from the network and displays it. It is possible for the portable terminal to send the command to network, and so the portable terminal can communicate with the GSM network using it.

However, the SAT service only supports the menu of the service provider. That is, it impossible to edit the menu, which a user of the portable terminal may want. Also, there is a problem in that the portable terminal cannot use the SAT service when moving to a roaming network. Accordingly, a need exists for an improved apparatus and method for providing an SIM Application Toolkit in a mobile communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for editing a service list of a Subscriber Identity Module (SIM) Application Toolkit (SAT) in a mobile communication system.

Another aspect of the present invention is to provide an apparatus and method for requesting a service list of SAT by Unstructured Supplementary Service Data (USSD) in a mobile communication system.

A further aspect of the present invention is to provide an apparatus and method for installing a downloaded applet of an SAT list in a mobile communication system.

According to an aspect of the present invention, an apparatus for providing a SIM Application Toolkit (SAT) in a portable terminal is provided. The apparatus includes an input unit for receiving a user request for an SAT service and for receiving a user request for an SAT menu item and a controller for requesting the SAT service in response to the user input for the SAT service, for requesting a list of SAT menu items, and for generating a request for an applet in response to the user input for the SAT menu item.

According to another aspect of the present invention, an apparatus for providing a SIM Application Toolkit (SAT) is provided. The apparatus includes a controller for generating an SAT list of SAT service items, for receiving an applet request, and for sending a requested applet to the portable terminal when the applet request is received and a communication unit for transmitting the SAT list to a portable terminal.

According to still another aspect of the present invention, a method for providing SIM Application Toolkit (SAT) in portable terminal is provided. The method includes requesting an SAT list including SAT service items, requesting an applet corresponding to a selected one of the items on the SAT list, receiving the requested applet from a server and installing the requested applet.

According to yet another aspect of the present invention, a method for providing a SIM Application Toolkit (SAT) by a toolkit management server is provided. The method includes creating an SAT list, transmitting the created list to a portable terminal when a request for the SAT list is received, receiving a request for an applet corresponding to an item on the SAT list, searching for the corresponding applet and transmitting the corresponding applet to the portable terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and a method for installing a downloaded applet of an SAT list in a portable terminal. In an exemplary implementation, the portable terminal requests the applet from a toolkit management server and installs the applet which is received corresponding to the request.

Figure 1:
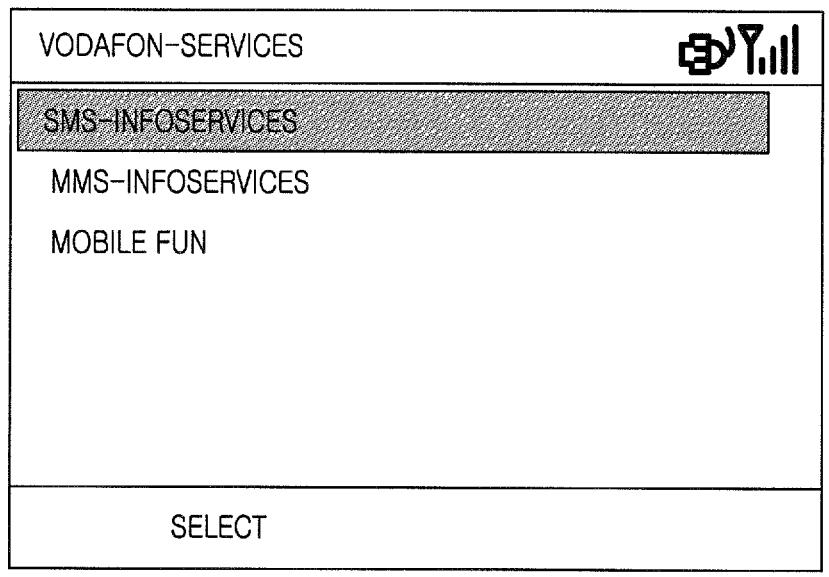
FIG. 1 illustrate a service screen of a conventional portable terminal.
Figure 2:
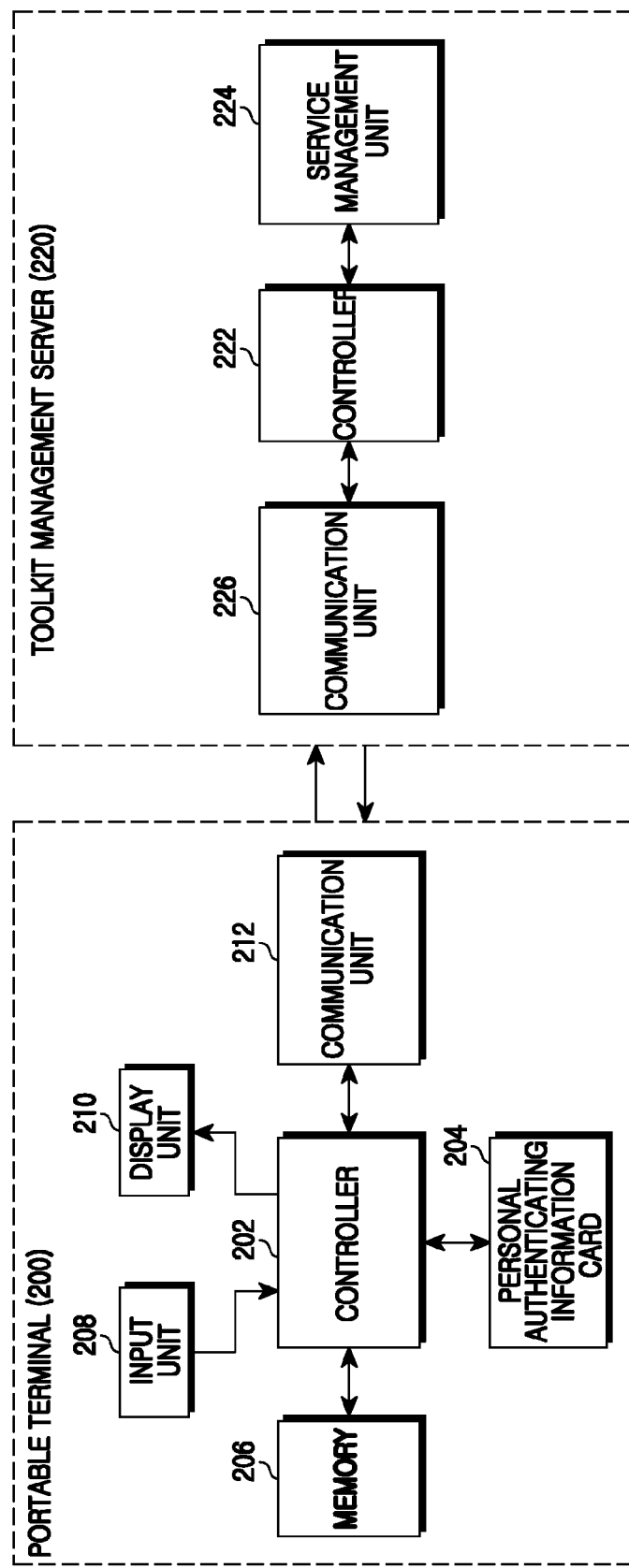
FIG. 2 is a block diagram of a method for providing a Subscriber Identity Module (SIM) Application Toolkit (SAT) service in a mobile communication system according to an exemplary embodiment of the present invention.

FIG. 2 is a block diagram of a method for providing a Subscriber Identity Module (SIM) Application Toolkit (SAT) service in a mobile communication system according to an exemplary embodiment of the present invention.

Referring to FIG. 2, the mobile communication system includes a portable terminal 200 and a toolkit management server 220. The portable terminal 200 includes a controller 202, a personal authenticating information card 204, a memory 206, an input unit 208, a display unit 210 and a communication unit 212.

The toolkit management server 220 includes a controller 222, a service management unit 224 and a communication unit 226.

The controller 202 provides control of the portable terminal 200. Specifically, the controller 202 controls voice calls and data communications.

According to an exemplary embodiment of the present invention, in addition to its typical functions, the controller receives a request for a SIM Application Toolkit (SAT), sends a requests for an SAT list to the toolkit management server 220 and receives the SAT list from the toolkit management server 220.

If the selection of an SAT menu item is detected, the controller sends information of the selected menu item to the toolkit management server 220.

In response to the request sent to the toolkit management server, the controller 202 receives an applet that is transmitted by the toolkit management server 220.

The controller 202 may request the SAT list using Unstructured Supplementary Service Data (USSD) services.

The personal authenticating information card 204 is attachable to and detachable from the portable terminal 200 and may include a microprocessor and a memory chip. The personal authenticating information card 204 may include a SIM card as a medium (e.g., smart card) for storing various information about the user.

In an exemplary embodiment, the personal authenticating information card 204 requests an SAT service list from the portable terminal 200 using an envelope command.

Further, the personal authenticating information card 204 may transfer the command requesting the SAT service list to the portable terminal 200 by use of a proactive command.

The memory 206 may include a Read Only Memory (ROM), a Random Access Memory (RAM), and a flash ROM. The ROM may store a program for controlling the controller 202 as well as various reference data.

The RAM is a working memory of the controller 202, and temporarily stores data generated when programs are running. The flash ROM stores various data which needs to be preserved and may be updated, such as a phone book, an outgoing message, an incoming message and the like.

In an exemplary implementation, the input unit 208 includes numeric key buttons (0 to 9), a menu button, an erase button, a confirm button, a talk button, an end button, an Internet access button, and a navigation key (or direction key) button as well as a plurality of function keys such as character input keys. The input unit 208 provides the controller 202 with key input data (e.g., request for an SAT service) corresponding to a key pressed by the user.

The display unit 210 displays state information generated while the portable terminal 200 is operating, numeric characters, moving pictures, still pictures, and so on. The display unit 210 may include a color Liquid Crystal Display (LCD). According to exemplary embodiments of the present invention, in addition to its typical functions, the display unit 210 displays an SAT service menu and results of the SAT service. If the display unit 210 is provided as an LCD, the display unit 210 may include a controller for controlling the LCD, a video memory in which image data is stored and an LCD element. If the LCD is provided as a touch screen, the display unit 210 may perform a part or all of the functions of the input unit 208.

The communication unit 212 transmits and receives a Radio Frequency (RF) signal including data which is input and output through an antenna (not shown). For example, in a transmitting process, data to be transmitted is subject to a channel-coding process and a spreading process, and then the data is transformed to an RF signal. In a receiving process, the RF signal is received and transformed to a base-band signal, and the base-band signal is subject to a de-spreading process and a channel-decoding process, thereby restoring the data.

According to exemplary embodiments of the present invention, in addition to its typical functions, the communication unit 212 may transmit and receive messages using a USSD service and may receive the applet which is transmitted by the toolkit management server 220.

The controller 222 of the toolkit management server 220 provides control of the toolkit management server 220.

The controller 222 generates an SAT service list for application in the portable terminal when a request is received for the SAT list.

The controller 222 controls transmission of the SAT service list to the portable terminal and searches for an applet corresponding to a selected SAT menu item.

Once discovered, the controller 222 transmits the searched applet to the portable terminal.

The communication unit 226 transmits and receives the message on behalf of the toolkit management server 220. In an exemplary implementation, the communication unit 226 transmits and receives the message using the USSD service.

The service management unit 224 generates the SAT list which is requested by the portable terminal. The service management unit 224 also searches for an applet corresponding to a selected menu item of the SAT list in the portable terminal The following is a description of a method for installing a downloaded applet corresponding to an SAT menu list item in a portable terminal according to an exemplary embodiment of the present invention.

Figure 3:
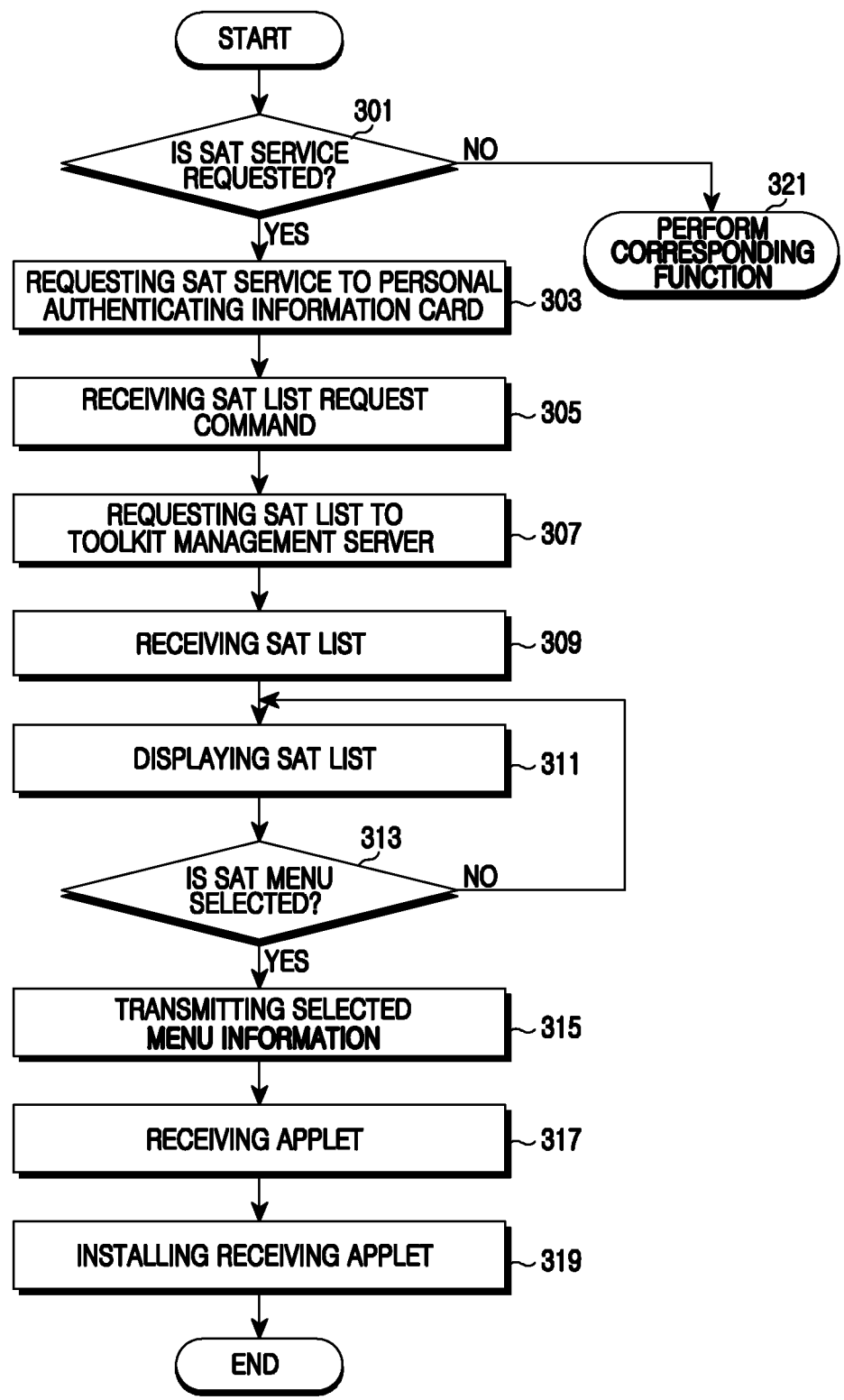
FIG. 3 is a flowchart illustrating a method for providing a SIM Application Toolkit (SAT) services in portable terminal according to an exemplary embodiment of the present invention.

FIG. 3 is a flowchart illustrating a method for providing SIM Application Toolkit (SAT) services in a portable terminal according to an exemplary embodiment of the present invention.

Referring to FIG. 3, the controller 202 of the portable terminal 200 detects whether an SAT service is requested in step 301.

If the controller 202 determines that the SAT service is not requested, the controller 202 proceeds to step 321 and executes a corresponding function (e.g. a standby mode)

Alternatively, if the controller 202 determines that the SAT service is requested, the controller 202 proceeds to step 303 and sends a request for the provision of SAT services to the personal authenticating information card 204.

In an exemplary implementation, the controller may send the request for the provision of SAT services using an envelope command, which is supported by the SAT, to the personal authenticating information card 204.

As described above, an envelope command denotes an instruction command that is transmitted from a terminal to a SIM (i.e. personal authenticating information card).

In step 305, the controller 202 receives a request for an SAT list which is sent by the personal authenticating information card 204.

In an exemplary implementation, the controller 202 may receive the request for the SAT list using a proactive command. As described above, a proactive command denotes an instruction command that is transmitted from a personal authenticating information card 204 to the terminal In step 307, the controller 202 controls to request the SAT list from the toolkit management server 220. In an exemplary implementation, the controller 202 may request the SAT list using a USSD service. In step 309, the controller 202 receives the SAT list from the toolkit management server 220.

In step 311, the controller 202 displays the list which is received from the toolkit management server In step 313, the controller 202 determines whether an SAT menu selection, generated by a user of the portable terminal, is detected.

More specifically, in step 313 the controller determines if a selection is made of an SAT menu item that the user is trying to download.

If a selection of an item from the SAT menu is detected, in step 315 the controller sends information of the user's selected menu item to the toolkit management server 220. In step 317, the controller 202 receives an applet, corresponding to the selected menu item, which is transmitted by the toolkit management server 220. In an exemplary embodiment, the toolkit management server 220 may transmit the applet using a Short Message Service-Point to Point (SMS-PP) download to the mobile device 200.

In step 319, the controller 202 installs the received applet. In an exemplary implementation, the controller 202 may control installation of the applet into the personal authenticating information card 204. More specifically, the controller 202 may receive the applet and store the applet in a temporary space in the controller, store the applet in the personal authenticating information card 204 and then delete the received applet from the temporary storage location in the controller 202. In other words, the controller 202 may store the applet into temporary space to facilitate installation of the applet.

Next, the controller 202 finishes this process.

Figure 4:
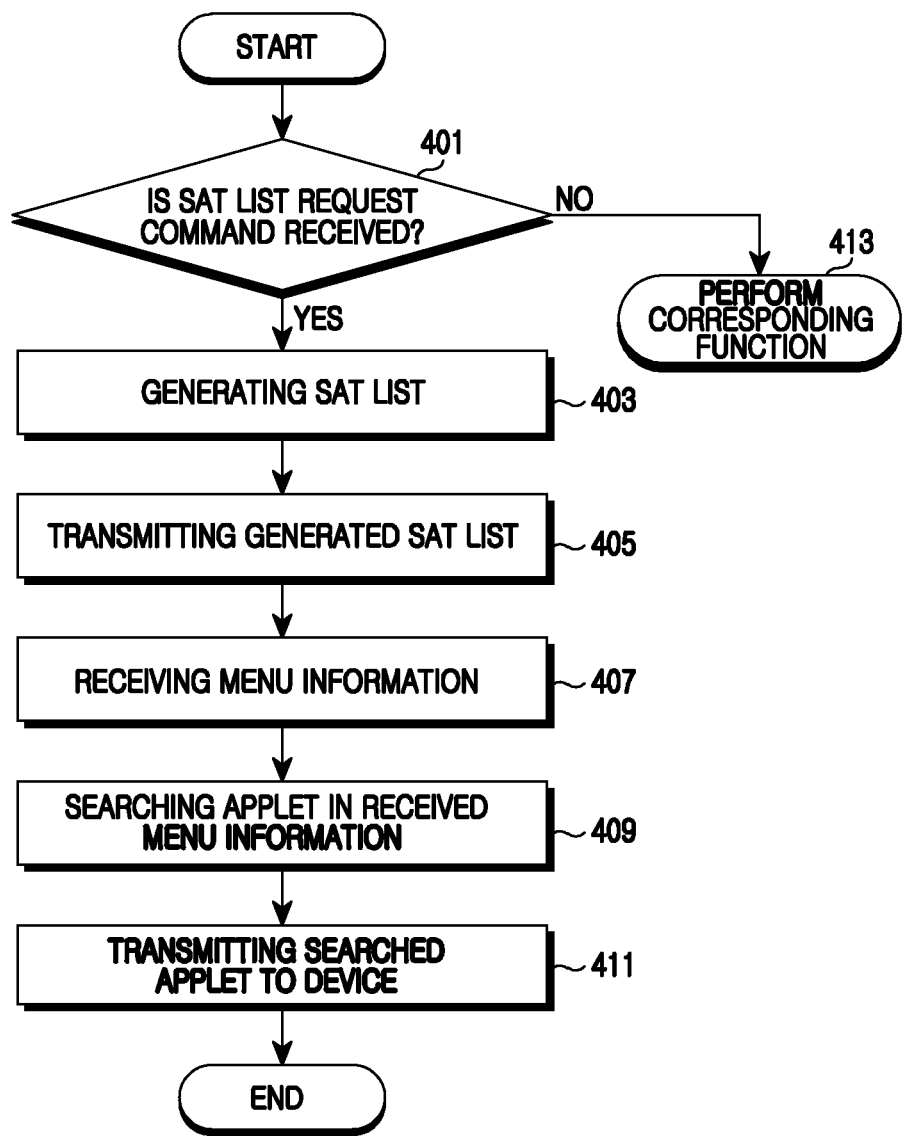
FIG. 4 is a flowchart illustrating a method for supporting a SIM Application Toolkit (SAT) service in a toolkit management server according to an exemplary embodiment of the present invention.

FIG. 4 is a flowchart illustrating a method for supporting a SIM Application toolkit service in a toolkit management server according to an exemplary embodiment of the present invention.

Referring to FIG. 4, the controller 222 of a toolkit management server 220 first determines whether it receives a request for an SAT list in step 401.

If the controller 222 determines that it has not received an SAT list request, the controller 222 proceeds to step 413 and executes a corresponding function such as standby mode.

Alternatively, if the controller determines in step 401 that it does receive a request for an SAT list, the controller 222 proceeds to step 403 and generates an SAT list. In step 405, the controller transmits the SAT list to the portable terminal 200.

In an exemplary embodiment, the SAT list generation includes the creation of a list of applicable applets for the portable terminal 200. Furthermore, if the list of applicable applets is modified (i.e. changed), the toolkit management server 220 may update the SAT list. That is, rather than create a new list of SAT applets, the toolkit management server 220 may determine if there is an existing SAT list and if the existing list has been modified. Accordingly, the toolkit management server may provide either the existing list or the updated existing list to the portable terminal, thus saving creation time.

In step 407, the service management unit 224 receives information about a menu choice from the portable terminal 200. In an exemplary embodiment, the menu choice information received from the portable terminal 200 represents a service item selected by a user for downloading.

In step 409, the controller 222 searches for an applet to be downloaded that corresponds to the particular selected menu item. In step 411, the controller 222 transmits the searched applet to the portable terminal 200 and then ends the process.

In an exemplary implementation, the controller 222 may send the searched applet to mobile device using an SMS-PP download.

Figure 5:
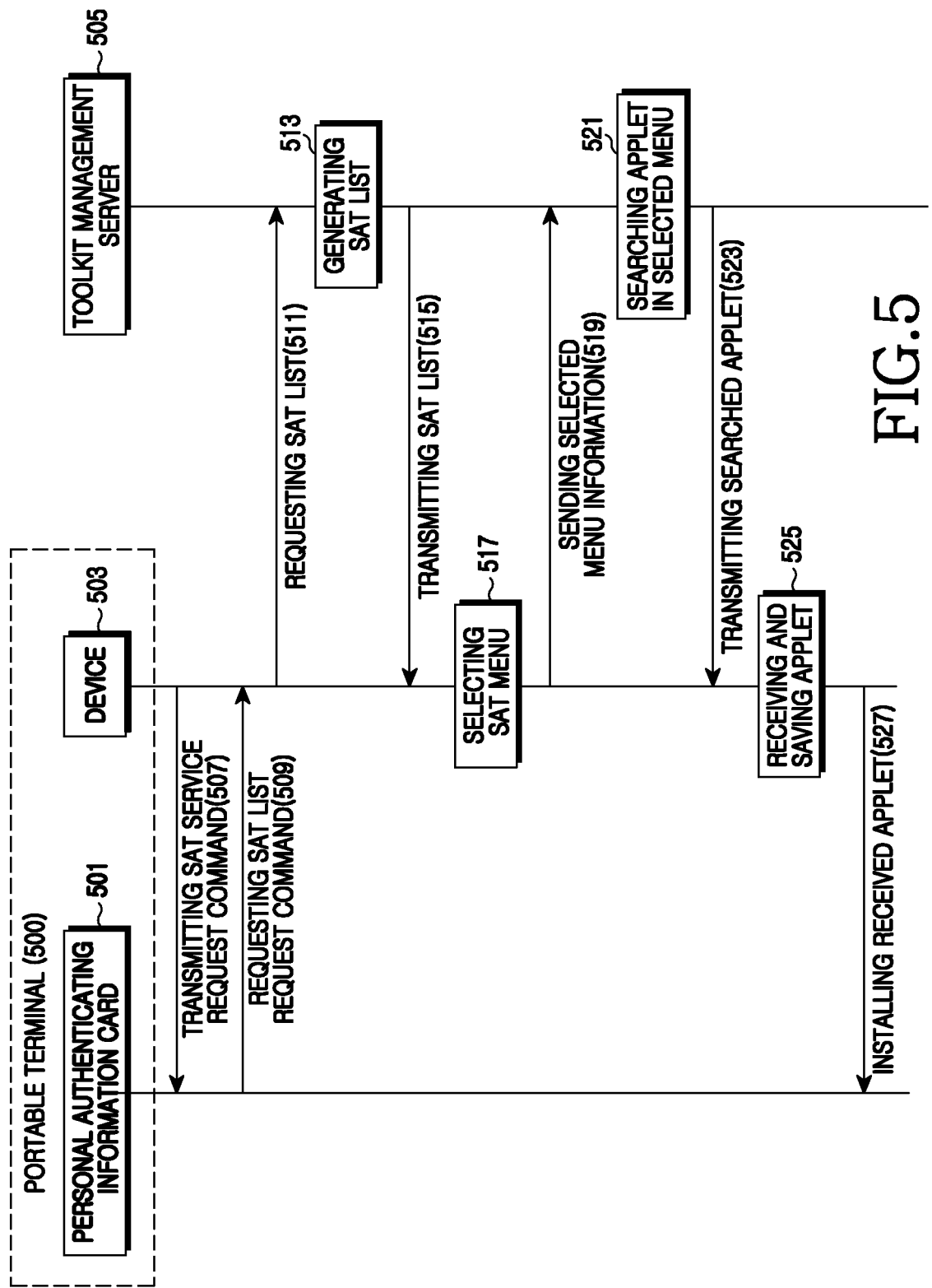
FIG. 5 is a flowchart illustrating a method for enabling SIM Application Toolkit (SAT) services in mobile communication system according to an exemplary embodiment of the present invention.

FIG. 5 is a flowchart illustrating a method for enabling a SIM application toolkit service in a mobile communication system according to an exemplary embodiment of the present invention.

FIGS. 6A-6G illustrate exemplary screens of a portable terminal using a SIM Application Toolkit (SAT) service according to an exemplary embodiment of the present invention.

Referring to FIG. 5, the mobile communication system includes a portable terminal 500 and a toolkit management server 505. The portable terminal 500 includes a personal authenticating information card 501 and a device 503.

Figure 6A:
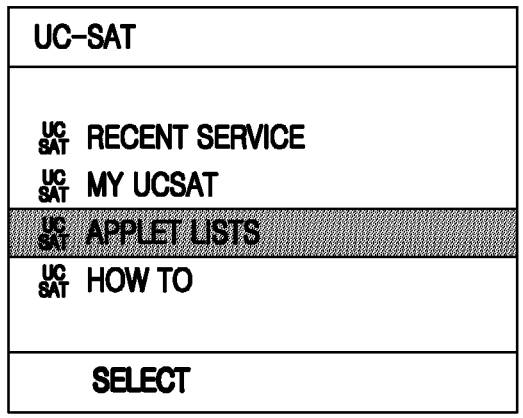
FIGS. 6A-6G illustrate exemplary screens of a portable terminal using a SIM Application Toolkit (SAT) service according to an exemplary embodiment of the present invention.

When an input is received for an SAT service, the device 503 transmits a request for the SAT service to the personal authenticating information card 501 in step 507. In an exemplary implementation, the device 503 may transmit the request using an envelope command which is supported by the SAT service to the personal authenticating information card using an SAT service menu as illustrated in FIG. 6A In step 509, the personal authenticating information card 501 transmits a request for an SAT list to the device 503. In an exemplary implementation, the personal authenticating information card 501 may transmit the request for the SAT list using a Proactive command.

In step 511, the device 503 transmits a request for the SAT list to the toolkit management server 505. In an exemplary implementation, the request is transmitted by a USSD service.

Figure 6B:
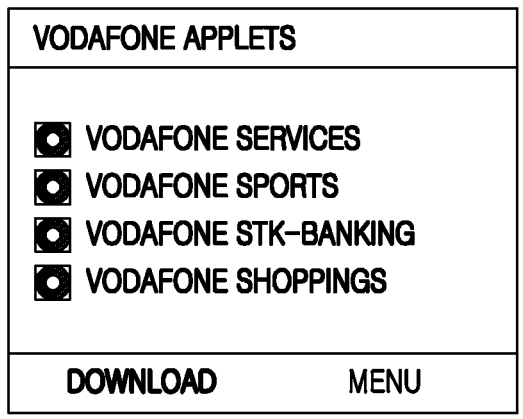

In step 513, the toolkit management server 505 generates an SAT list which may include a list of applets as illustrated in FIG. 6B. If the list of applets is modified (changed), the toolkit management server 505 may update the SAT list.

In step 515, the toolkit management server 505 transmits the generated SAT list to the device 503. Upon receipt of the list, the device 503 may display the received list and, in step 517, a user may select an item from the displayed list.

Figure 6C:
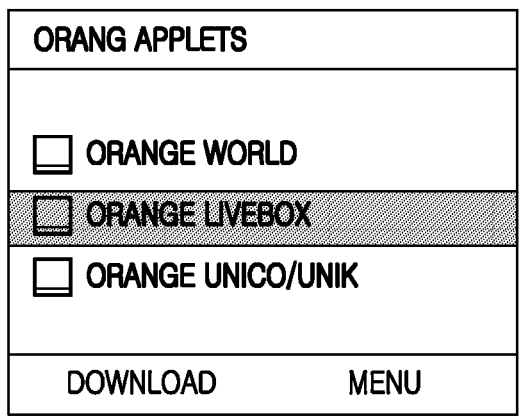

If an item is selected from the displayed list, the device 503 transmits the information of the selected SAT menu item to the toolkit management server 505 in step 519. In an example as illustrated in FIG. 6C, a user may select an item for download from a displayed SAT menu list. In the example of FIG. 6C, the user selects "ORANGE LIVEBOX." Upon detecting the selection of the SAT menu item that the user is trying to download, the device 503 transmits the menu item information to the toolkit management server 505.

In step 521, the toolkit management server 505 searches for an applet that corresponds to information of the selected SAT menu item and in step 523 transmits the searched applet to the device 503.

Figure 6D:
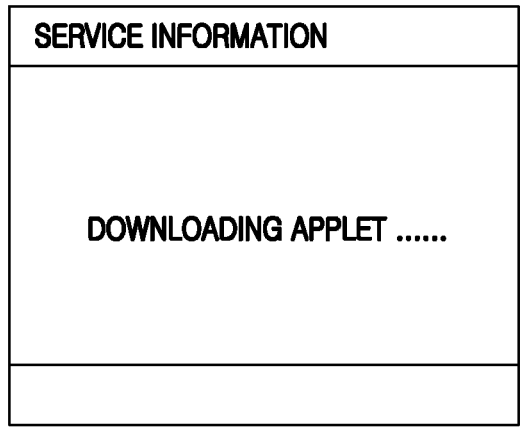

In step 525, the device 503 that requested the applet receives and stores the applet. During the transmission and storage of the applet, the portable terminal may display an indication that the applet is being received as illustrated in FIG. 6D. In step 527, the device 503 transmits the received applet to the personal authenticating information card 501 for installation. The installation of the applet may be automatic or may include installation of the applet at the user's direction.

Figure 6E:
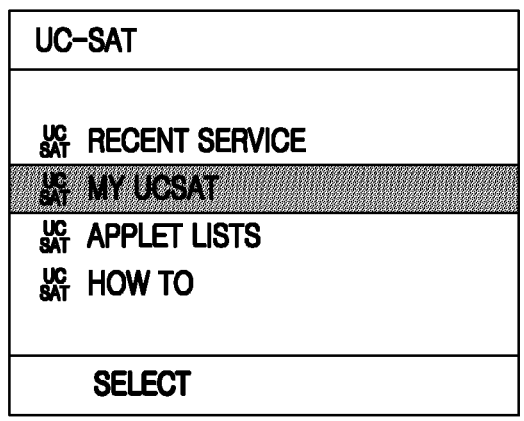
Figure 6F:
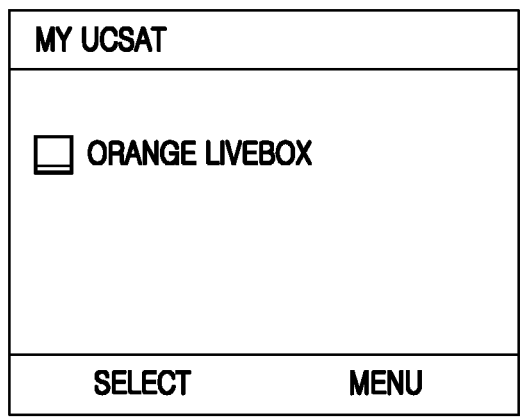

The device 503, which installed the applet, may display an SAT service menu as illustrated in FIG. 6E. Then, if selection of the SAT menu item (e.g. "MY UCSAT") is detected as also illustrated in FIG. 6E, the device 503 may operate the installed applet as illustrated in FIG. 6F.

Figure 6G:
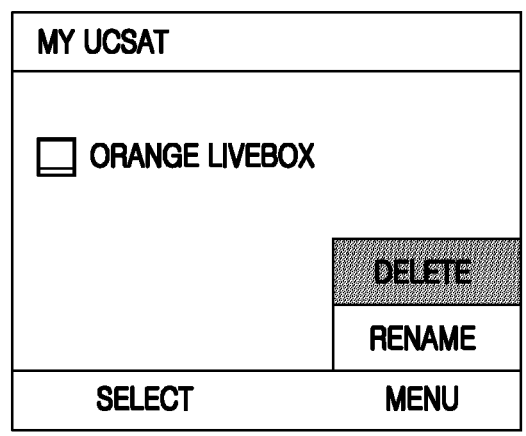

Furthermore, as illustrated in FIG. 6G, the device 503 not only installs the received applet and but is also able to delete and rename the received applet.

As set forth above, exemplary embodiments of the present invention provide an apparatus and a method for installing a received applet of an SAT list in a portable terminal. In another exemplary embodiment, the portable terminal requests the applet from the toolkit management server and installs the applet that is received from the SAT service corresponding to request.

Furthermore, exemplary embodiments of the present invention may add or delete the SAT service item.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A portable terminal for providing a Subscriber Identity Module (SIM) Application Toolkit (SAT), the terminal comprising:
    an input unit for receiving a user request for an SAT service and for receiving a user request for an SAT menu item;
    a controller for requesting the SAT service in response to the user input for the SAT service, for requesting a list of SAT menu items, and for generating a request for an applet in response to the user input for the SAT menu item,
    wherein the controller controls installation of a received applet and at least one of deletion and modification of the installed applet, and
    wherein the request for the list of SAT menu items includes information related to a current list of SAT menu items.

2. The terminal of claim 1, further comprising a personal authenticating information card for installing an applet received in response to the request by the controller.

3. The terminal of claim 2, wherein the controller requests the applet from a toolkit management server after receiving the list of SAT menu items.

4. The terminal of claim 2, wherein the controlling of the installation of the applet includes temporarily storing the applet by the controller and deleting the temporarily stored applet after the installing of the applet.

5. The terminal of claim 3, wherein the controller requests the SAT menu list and the applet using an Unstructured Supplementary Service Data (USSD) service.

6. The terminal of claim 3, wherein the controller controls the receiving of the applet using a Short Message Service-Point to Point (SMS-PP) download.

7. An apparatus for providing a Subscriber Identity Module (SIM) Application Toolkit (SAT) in a toolkit management server, the apparatus comprising:
    a controller for receiving a request for an SAT list of SAT service items, for generating an SAT list of SAT service items based on the request for receiving an applet request, and for sending a requested applet to the portable terminal when the applet request is received; and
    a communication unit for transmitting the SAT list to a portable terminal,
    wherein the generating of the SAT list is based on information related to a current list of SAT menu items.

8. The apparatus of claim 7, wherein the communication unit transmits the applet using a Short Message Service-Point to Point (SMS-PP) download.

9. The apparatus of claim 7, wherein the controller generates the SAT list by determining if a previous SAT list exists.

10. The apparatus of claim 9, wherein the controller generates the SAT list using the previous SAT list after determining if an update to the previous SAT list is required.

11. A method of providing a Subscriber Identity Module (SIM) Application Toolkit (SAT) in a portable terminal, the method comprising:
    requesting an SAT list including SAT service items based on a current list of SAT menu items;
    requesting an applet corresponding to a selected one of the items on the SAT list;
    receiving the requested applet from a server;
    installing the requested applet; and
    at least one of deleting and modifying the applet after the installing of the installed applet.

12. The method of claim 11, further comprising receiving an SAT list request from a personal authenticating information card before the requesting of the SAT list.

13. The method of claim 12, wherein the requesting of the applet comprises using an Unstructured Supplementary Service Data (USSD) service.

14. The method of claim 12, wherein the receiving of the applet from a service comprises using a Short Message Service-Point to Point (SMS-PP) download.

15. The method of claim 12, wherein the installing of the applet comprises installing the applet into the personal authenticating information card.

16. The method of claim 15, wherein the installing of the applet further comprises:
    temporarily storing the applet; and
    deleting the temporarily stored applet after the installing of the applet in the personal authenticating information card.

17. A method for providing a Subscriber Identity Module (SIM) Application Toolkit (SAT) by a toolkit management server, the method comprising:
    receiving a request for an SAT list, the request including information related to a current list of SAT menu items;
    creating an SAT list based on the request;
    transmitting the created list to a portable terminal;
    receiving a request for an applet corresponding to an item on the SAT list;
    searching for the corresponding applet; and
    transmitting the corresponding applet to the portable terminal.

18. The method of claim 17, wherein the transmitting of the corresponding applet comprises using a Short Message Service-Point to Point (SMS-PP) download.

19. The method of claim 17, wherein the creating of the SAT list comprises:
    determining if a previous SAT list exists; and
    if the previous SAT list exists, using the previous SAT list.

20. The method of claim 19, further comprising:
    determining if an update to the previous SAT list is required; and
    if the update to the previous SAT list is required, updating the previous SAT list prior to transmitting the SAT list to the portable terminal.

* * * * *